United States Patent
Olson et al.

(10) Patent No.: US 6,885,713 B2
(45) Date of Patent: Apr. 26, 2005

(54) ELECTROMAGNETIC MATCHED FILTER BASED MULTIPLE ACCESS COMMUNICATIONS SYSTEMS

(75) Inventors: Tim Olson, DeLand, FL (US); Ulf Osterberg, Etna, NH (US); Dennis Healy, Hyattsville, MD (US); Seung Choi, Hanover, NH (US)

(73) Assignee: Comlink 3000 LLC, CT (US)

( * ) Notice: Subject to any disclaimer, the term of this patent is extended or adjusted under 35 U.S.C. 154(b) by 259 days.

(21) Appl. No.: 09/752,392

(22) Filed: Dec. 29, 2000

(65) Prior Publication Data

US 2005/0053176 A1 Mar. 10, 2005

Related U.S. Application Data

(60) Provisional application No. 60/173,882, filed on Dec. 30, 1999.

(51) Int. Cl.$^7$ ................................................. H04B 1/10
(52) U.S. Cl. .................... 375/350; 375/143; 375/150; 375/316; 398/161; 398/182; 398/85; 398/48; 716/1; 716/2; 716/5
(58) Field of Search ..................... 716/1–3, 5; 375/143, 375/150, 316, 350; 398/161, 182, 85, 48

(56) References Cited

U.S. PATENT DOCUMENTS

| | | | | |
|---|---|---|---|---|
| 3,771,072 A | * | 11/1973 | Slobodnik, Jr. | 333/155 |
| 4,370,648 A | * | 1/1983 | Wagner et al. | 340/825.2 |
| 5,007,705 A | * | 4/1991 | Morey et al. | 385/12 |
| 5,384,725 A | * | 1/1995 | Coifman et al. | 708/801 |
| 5,487,120 A | * | 1/1996 | Choy et al. | 385/24 |
| 5,548,431 A | | 8/1996 | Shin et al. | 359/119 |
| 5,548,531 A | | 8/1996 | Shabeer | 364/514 |
| 5,563,664 A | * | 10/1996 | Yang et al. | 348/475 |

(Continued)

FOREIGN PATENT DOCUMENTS

| | | | |
|---|---|---|---|
| JP | 09055693 A | * | 2/1997 |
| WO | WO - 200150663 A | * | 7/2001 |

OTHER PUBLICATIONS

International Search Report in PCT/US00/35570 mailed Apr. 11, 2001.

(Continued)

*Primary Examiner*—Shuwang Liu
*Assistant Examiner*—Chris C. Chu
(74) *Attorney, Agent, or Firm*—DLA Piper Rudnick Gray Cary US LLP (57) ABSTRACT

An electromagnetic matched filter based multiple access communications system having a source of modulated pulses from a digital data stream; an initial filter which shapes the incoming modulated pulse into a desired pulse for transmission across the communication medium; a second filter, identical to the initial filter, which is matched to the pulse which exit the communication medium, a detector which converts the modulated pulse stream into the original digital data stream, and signals which are designed with specific mathematical properties which make the system efficient and minimizes crosstalk between channels. The signals decay rapidly from the central lobe at a higher than 1/x rate and the zero points of the autocorrelation function having high order multiplicities. The type of system allows multiplexing of multiple data streams with much greater flexibility, robustness, and density.

11 Claims, 5 Drawing Sheets

U.S. PATENT DOCUMENTS

| | | | | |
|---|---|---|---|---|
| 5,717,713 A | * | 2/1998 | Natali | 375/149 |
| 5,786,915 A | | 7/1998 | Scobey | 359/127 |
| 5,835,199 A | | 11/1998 | Phillips et al. | 356/5.03 |
| 5,844,596 A | * | 12/1998 | Goodman | 348/14.02 |
| 5,960,029 A | * | 9/1999 | Kim et al. | 375/140 |
| 5,999,282 A | * | 12/1999 | Suzuki et al. | 359/20 |
| 6,094,464 A | * | 7/2000 | Ebringer et al. | 375/342 |
| 6,445,801 B1 | * | 9/2002 | Pastor et al. | 381/94.2 |

OTHER PUBLICATIONS

Coifman, R.R. and Y. Meyer, "Remarques sur l'analyse de Fourier à fenêtre", Compte rendus de l'Academic odes Sciences, seria I, Mathematique, vol. 312, pp. 259–261, 1991. (French).

C.K. Chui, ed., *Wavelets: A Tutorial in Theory and Application*, Academic Press, "Local Sine and Cosine Bases of Coifman and Meyer and the construction of smooth wavelets," pp. 237–256, 1992. (English translation of document AR).

* cited by examiner

ELECTROMAGNETIC MATCHED FILTER BASED MULTIPLE ACCESS COMMUNICATIONS SYSTEMS

CROSS REFERENCE TO RELATED APPLICATION

This application claims the benefit under Title 35 U.S.C. §120 of United States Provision Application No. 60/173,882 filed on Dec. 30, 1999.

FIELD OF INVENTION

The present invention relates to all types of multiplexing and modulation communications systems. Examples of such systems include radio and optical communications in such communications media as wireless, copper, or fiber optics. The invention produces a series of signals that allow modulation and multiplexing at a density beyond the standards used today.

DESCRIPTION OF THE PRIOR ART

Multiplexing and Demultiplexing:

The basic concept of a multiplexing system is the sending of multiple communication streams on the same line. A form of multiplexing is time-division multiplexing. This form of multiplexing allocates various sequential bits in a communication stream to different users. For instance the first, fifth, and ninth bits would be one user's bits, the second, sixth, and tenth a second user's bits, and so on. The transmitter or multiplexor knows what time slots to utilize when transmitting a user's information and the receiver or demultiplexor knows at what time slots the user's information will arrive.

Wavelength division multiplexing (WDM) is a second type of multiplexing. WDM utilizes a different wavelength, or a corresponding frequency, in order to separate different communication streams or users. Thus, in a communications system, one user would utilize a source which transmits a signal sin (c1*t), while another user would utilize a source which transmits a second signal sin (c2*t). The multiplexing is done by transmitting separate wavelengths. The demultiplexing is accomplished by separating the wavelengths at the receiver end.

An optical system can easily separate two frequencies, such as two colors of light on a fiber optic system. There are a number of methods to accomplish the goal of separating the frequencies. Spatial light separation of the frequencies is one method. This method uses a prism, optical grating, or other diffractive devices in order to separate the different frequencies. Another method to separate the frequencies uses dispersion in optical materials or filters, such as thin film filters, in-fibers gratings, or Bragg grating based filters. Such filters have no difficulty separating the two channels only as long as only one frequency is present in each of the two streams.

Modulation:

While individual wavelengths are easily separated by optical means, the individual wavelengths have to be modulated in order for there to be any information carried by the communication stream. The problem with the simplistic demultiplexing process described above flows from the fundamental tenet of communication that one frequency, transmitting alone, cannot transmit any information. The amount of information that can be transmitted is directly proportional to the bandwidth of the communication stream. Because the bandwidth of an individual frequency is 0, no information can be transmitted on that individual frequency.

The key to the transmission of information is that the source, i.e. the sin(c1 t) source, must be modulated in order to transmit information. Perhaps the oldest form of modulation, which is equivalent to sending smoke signals, is on/off keying (OOK). this is the equivalent of sending a series of smoke signals, i.e. either the smoke goes up and is observed or it is not. Similarly, in a modern digital communication system, the source is either turned on so that it transmits a signal to the end user, indicating a 1, or it is turned off, so that the end user receives no signal, indicating a 0. This allows a simple transmission of 0, 1 digital data.

The problem with modulating the transmitted signal, as above, is that the number of frequencies in the transmitted signal are greatly increased. This is necessary in order to transmit information, but it makes the separation of different multiplexed channels much more difficult. In the theoretical situation of the above reference OOK, if the source is instantaneously turned on and instantaneously turned off, the resulting signal stream will have infinite bandwidth. It is well known that the frequency spectrum in this case shows the form $\sin(x-f1)/(x-f1)$, where f1 is the original frequency of the source. The difficulty of separating these types of signals, or channels, is well known. When the channels use overlapping portions of the frequency spectrum, simple prisms or corresponding material-based filters will not be able to efficiently separate the different communication streams.

Another known method for modulating the communication source is called phase shift keying (PSK). In on/off keying (OOK), the 0's and 1's are literally transmitted on the waveform, i.e. either 1 x sin (c1 t) is transmitted or 0 x sin (c1 t)=0 is transmitted. In phase shift keying either 1 x sin(c1 t) is transmitted for a 1, or −1 x sin (c1 t) is transmitted for the 0. While it might seem that the spectral problems of OOK are lessened in PSK, the reality is that the spectral problems of PSK are identical to those of OOK, as illustrated in FIG. 1.

Electromagnetic Filtering:

It is known that the nature of the materials from which electromagnetic filters are made causes the responses of the material to light or other electromagnetic signals to depend upon the frequency of the signal impacting the material. Typical electromagnetic filtering can be accomplished with an in-fiber grating, a Bragg grating, a thin film filter, a spatial light separation filter, or any filter which can independently alter the amplitude and frequency of individual frequencies. Different electromagnetic filters change the amplitude and phase of specific wavelengths in different ways. This filtering process is mathematically equivalent to a convolution filter. However, the impossibility of sampling instantaneously in time generally results in significant crosstalk between adjacent channels.

Accordingly, a new electromagnetic matched filter process with specially designed signals is needed that optimizes the process of matched filtering entirely via electromagnetic components.

SUMMARY OF THE INVENTION

The invention introduces a method to produce mathematical signal designs for a communication system. It also introduces new mathematical signal designs to a communications system. The method and the designs provide new and far reaching advantages over conventional communications systems. These new advantages allow more of the bandwidth within the system to be used. A basic tool which is used to analyze a communication system is the autocorrelation function. This invention creates a new signal design and a device which more completely follow and execute two fundamental mathematical concepts in a communications system: 1) The autocorrelation function will decay rapidly from the central lobe, i.e. at a higher than 1/x rate which is typical of a WDM system. 2) The zero points of the autocorrelation function are designed with high order zero multiplicities, greatly reducing crosstalk. This type of system allows multiplexing of multiple data streams with much greater flexibility, robustness, and density.

The method involves choosing a signal which is periodically orthogonal to its translates, determining a first autocorrelation function associated with the signal, determining the Fourier transform of the first autocorrelation function, forming a second autocorrelation function by convolving the first autocorrelation function with itself; determining the square root of the second autocorrelation function, and taking the inverse Fourier transform of the square root process.

The device consists of a filter made in accordance with the method described above.

DETAILED DESCRIPTION OF THE INVENTION

The present invention will be understood more fully from the detailed description given below and from accompanying drawings of preferred embodiments of the invention, which, however, should not be taken to limit the invention to a specific embodiment, but are for explanation and understanding only.

Figure 1:
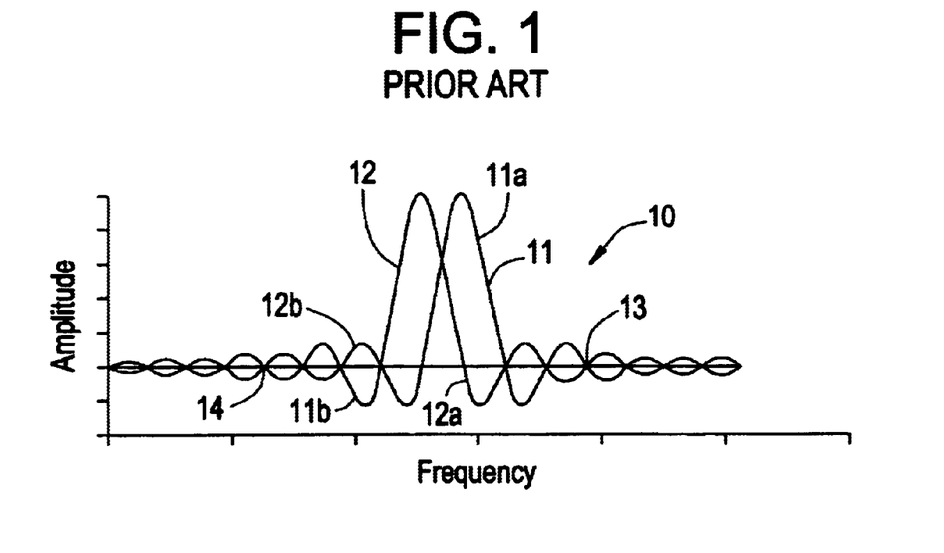
FIG. 1 is a graph illustrating the problems with the prior art. It is a graph of the spectrum of two wavelength division multiplexing (WDM) channels depicting overlapping energy between the channels. It is also an illustration of the autocorrelation function for a standard WDM system.

As the number of frequencies in a transmitted signal are greatly increased in order to transmit information, the task of separating the different multiplexed channels becomes much more difficult. The difficulty of separating these types of signals is illustrated in FIG. 1. Referring now to FIG. 1, graph 10, which plots frequency along the horizontal axis and amplitude along the vertical axis, illustrates the difficulty of separating two multiplexed WDM channels. Curve 11 illustrates a frequency spectrum of one channel and curve 12 illustrates a frequency spectrum of a separate channel. Because both channels use overlapping portions of the frequency spectrum, there is a great deal of overlapping energy between the channels illustrated in curve 11 and curve 12. The overlapping energy occurs, for example, in the areas bounded by curve segments 11a and 12a and curve segments 11b and 12b. This overlapping energy results in crosstalk between the channels in prior art systems. Simple prisms or other filters manufactured from other materials cannot efficiently separate the different communication streams in the channels.

When phase shift keying either transmits 1 x sin (c1 t) for a 1 or −1 x sin (c1 t) for a 0, this simple change will allow the communication source to be on continuously and one might think that this would keep the spectrum from being spread as dramatically as is illustrated in FIG. 1. However, the reality is that the phase changes, that is, the changes from 1 to −1, have the same effect on the spectrum and the same problems with the spectrum will occur as are illustrated in FIG. 1.

Crosstalk in communication systems utilizing convolution filters can also be analyzed via an autocorrelation function. Orthogonality between channels is indicated by periodic zeros in the autocorrelation function. The problem with typical WDM channels is that while these zeros exist at the appropriate times, they are only instantaneous in time and frequency. In order to get adequate signal for each bit, however, the receiver must integrate the signal for a non-trivial amount of time. In addition, it is impossible to only sample one exact frequency. These two problems result in very significant crosstalk between adjacent channels.

These two problems are also illustrated in FIG. 1. The sinc functions in FIG. 1 are equivalent to the autocorrelation function for each channel. The places where these functions are exactly zero signify the locations in frequency where there is no cross talk. Such zero points are shown, for example, at points 13 and 14 along the horizontal axis in FIG. 1. A similar graph results when the horizontal axis is plotted as time. That is, there are very specific and instantaneous points in time where there is no cross talk. However, the uncertainty of sampling instantaneously in time and sampling exactly in frequency makes it necessary to space channels much farther apart than the theoretical bandwidth. In reality one must integrate in time, over a non-trivial portion of the frequency spectrum, so that the cross talk away from these theoretical points of zero cross talk will be felt by the system and will be very significant.

Figure 2:
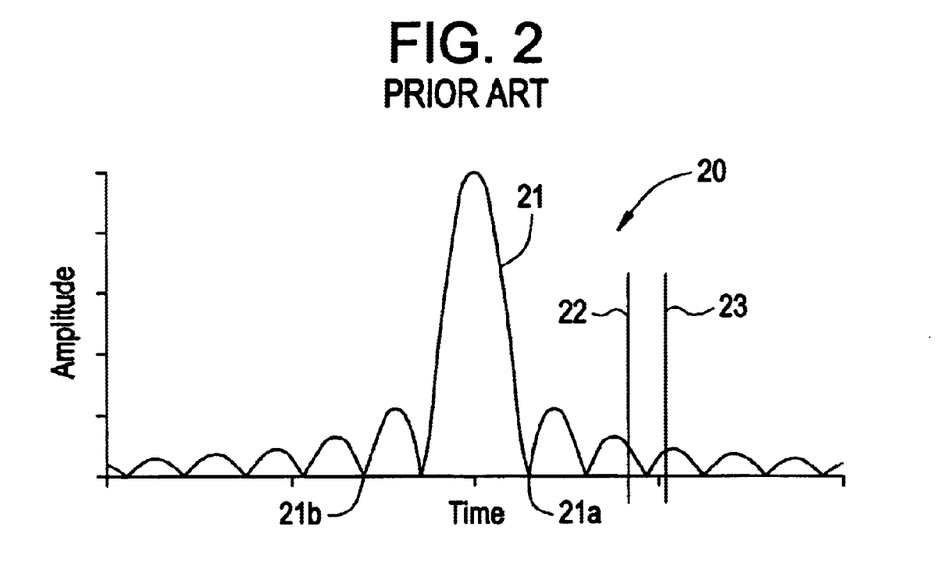
FIG. 2 is another graph illustrating the problems with the prior art. It is a graph further illustrating the crosstalk problems with a WDM system. It shows the crosstalk induced by one additional user.

Another way to visualize the problems with crosstalk in a prior art WDM system is illustrated in FIG. 2 which illustrates the autocorrelation function 20 in a WDM system. The graph 21 is FIG. 2 plots time along the horizontal axis and amplitude along the vertical axis. Graph 21 for the WDM autocorrelation function 20 is, coincidentally, the same shape as the spectrum of the transmitted signals. The zeros of this autocorrelation function, for example points 21a and 21b, represent potential additional users, or additional bits in a bit stream. The area under the curve of this autocorrelation function around these zeros is equivalent to the amount of crosstalk energy in the system. The area of crosstalk is shown as the area under the curve between the two lines 22 and 23 in FIG. 2. The area between the lines 22 and 23 illustrated in FIG. 2 represents the crosstalk induced by one additional user. Each zero has corresponding crosstalk energy in a fixed finite region around each zero in FIG. 2 similar to the crosstalk energy illustrated by lines 22 and 23. The area in all of the fixed finite regions under the curve around all of the zeros of the autocorrelation function represent the total crosstalk energy. The total crosstalk energy grows without bound as more channels are added. The integration time required to achieve acceptable signal to noise ratios dictates that orthogonal signals are not sufficient to completely eliminate crosstalk.

The invention described herein solves the above mentioned problems with crosstalk by introducing signals to the system which are specifically designed to have favorable autocorrelation functions. The fundamental ideas of the invention center around the idea that instead of the autocorrelation function represented by FIG. 2, an autocorrelation function such as that shown in FIG. 3 must be created by adaptively designing the signals. This redesign of the signals that will propagate through the system greatly reduces crosstalk.

The invention introduces signals to the communication systems which induce a number of positive properties to the autocorrelation functions. Property (1) is that the autocorrelation function associated with the signals of our invention decay rapidly from the central lobe; i.e., at a higher than 1/x rate which is typical of a WDM system. Property (2) is that the zero points of the autocorrelation function are designed with high order multiplicities, greatly reducing crosstalk.

Our method starts with any one of a wide variety of signals which are well known in the literature and operates on the known signals in ways which satisfy the above properties; i.e., Property (1) and Property (2). An example of a set of mathematical signals which produce an autocorrelation function with some of the mathematical properties described above has been introduced to the mathematical literature by R. R. Coifman and Y. Meyer, "Remarques sur l'analyse de Fourier a fenetre," Compte rendus de l'Academie edes Sciences, seria I: Mathematique, Vol. 312, 1991, pp. 259–261 and translated into English in "Local Sine and Cosine Bases of Coifman and Meyer and the Construction of Smooth Wavelets," Pascal Auscher, Guido Weiss, and M. Victor Wickerhauser in "Wavelets: A tutorial in Theory and Application," C. K. Chui, editor, pp. 234–256, Academic Press, 1992 (hereinafter "Coifman and Meyer"). One embodiment of our invention applies the mathematical properties of Coifman and Meyers to communications systems.

Figure 3:
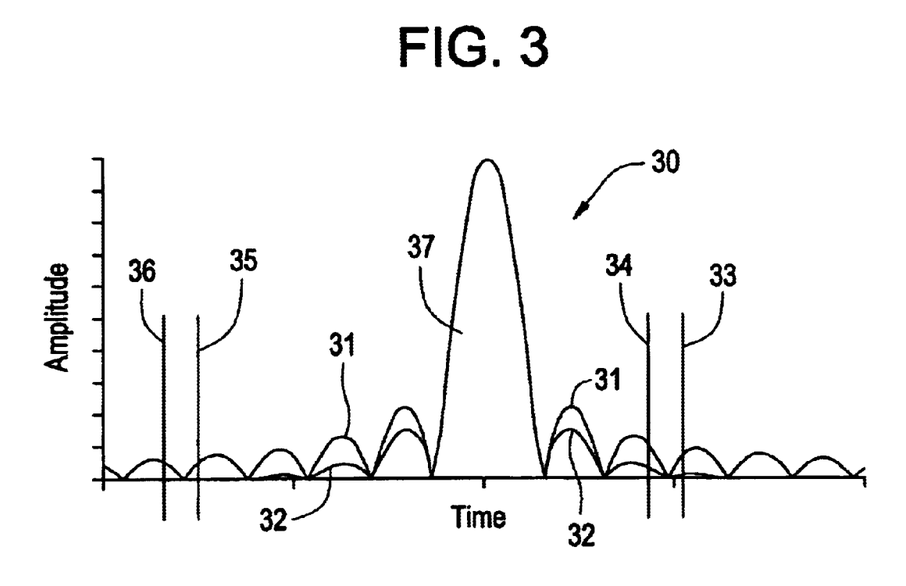
FIG. 3 is a graph illustrating the achievement of a significant reduction in crosstalk energy achieved in accordance with the invention.

When the mathematical properties of Coifman and Meyers are applied to communications systems, the signals, local trigonometric signals, achieve the autocorrelation function illustrated in FIG. 3. The construction outlined in Coifman and Meyer provides for a window function w(f), which is the basis for the signals. An examination of this window function reveals that its autocorrelation function has periodic zeros. This implies that if the spectrum of the signal is the window function w(f), then translates of those signals will be orthogonal, and have the autocorrelation function with the mathematical properties described above and illustrated in FIG. 3. This is exactly what is needed for an efficient communications systems: A basic signal which can periodically transmit bits with each of these transmitted bits being orthogonal to one another, and with an autocorrelation function such as that illustrated in FIG. 3.

The construction of the window function w(f) in Coifman and Meyer provides another fundamental advantage for a communication system. The windows described in Coifman and Meyer allow one to overlap two windows, w1(f) and w2(f), in a very special way. If the signals s1(t) and s2(t) have spectra which are essentially equivalent to w1(f) and w2(f) then the periodic translates of s1(t) and s2(t) will all be orthogonal to each other. Thus the autocorrelation function for the system will be similar to that in FIG. 3, and the cross correlation function for the systems will also show similar characteristics, i.e. periodic zeros and rapid decay.

Thus this invention would utilize k different signals s1(k) . . . sk(t), which have the mathematical characteristics outlined above. When these signals are transmitted at appropriate points in time, they will remain orthogonal in the communication system and allow for optical demultiplexing at the other end of the communication system. This allows one to pack the spectrum of a communications systems with a series of signals which enables a full bandwidth, or a nearly full bandwidth, communications systems. The system we have invented uses this methodology.

Referring to FIG. 3, graph 30 plots time along the horizontal axis and amplitude along the vertical axis and illustrates the achievement of a significant reduction in the crosstalk energy of the system. Curve 31 illustrates a frequency spectrum of one channel and curve 32 illustrates a frequency spectrum of a separate channel. The area between lines 33 and 34 and below curve 31 represents the crosstalk energy of a WDM system. The area under curve 32 represents the crosstalk in the system which our invention produces. The application of Coifman and Meyers windows to communications systems lowers the crosstalk.

The area under curves 31 and 32 between lines 35 and 36 shows an even more dramatic result. There is still significant crosstalk energy generated by curve 31; but almost none under curve 32. The curves in FIG. 3 show that adding additional channels to the system represented by curve 32 will not increase crosstalk in distant channels and will increase crosstalk only in neighboring channels. FIG. 3 shows that the crosstalk is greatly lowered by applying the Coifman and Meyer mathematical properties to communications systems. Although there is still significant crosstalk energy generated by curve 31, there is almost none under curve 32. Therefore, adding additional channels to a communication system represented by curve 32 will not increase crosstalk in distant channels. It will only increase crosstalk in neighboring channels.

While the construction outlined in Coifman and Meyer accomplishes some of the mathematical goals outlined in this invention, it is only one of many mathematical constructions which accomplishes one of the mathematical goals of this invention. Other autocorrelation functions with similar favorable mathematical properties can also be used.

While the above described Coifman and Meyers windows will virtually eliminate crosstalk with a distant channel, they do not eliminate crosstalk with channels which are relatively close to an operating channel. They do not eliminate crosstalk in the near channels because the Coifman and Meyer frequency windows, and the corresponding signals, only satisfy Property (1) described above. A simple square window in frequency will not satisfy either of the above described properties. Therefore, these measures won't allow full bandwidth utilization of the system. As shown in FIG. 3, the crosstalk from distant channels is very small, as illustrated by the area under curve 32 and between lines 34—34 and lines 35–36. Therefore, additional channels added to a system represented by curve 32 will not increase crosstalk in distant channels. However, the crosstalk from near channels, represented by the area under the curve 32 around the zeros close to midpoint 37 of FIG. 3 is still very significant. Indeed, the crosstalk from the near channels is almost identical to that of the original system shown in FIG. 2.

To address the near channel cross talk problem, we use an autocorrelation function which is zero in a region around the orthogonality points, or zeros of the autocorrelation function by taking the windows described by Coifman and Meyer and convolving them. Fourier analysis shows that the resulting autocorrelation function will then be the square of the original autocorrelation function. An illustration of the mathematical properties of this type of autocorrelation function is shown in FIG. 4.

Figure 4:
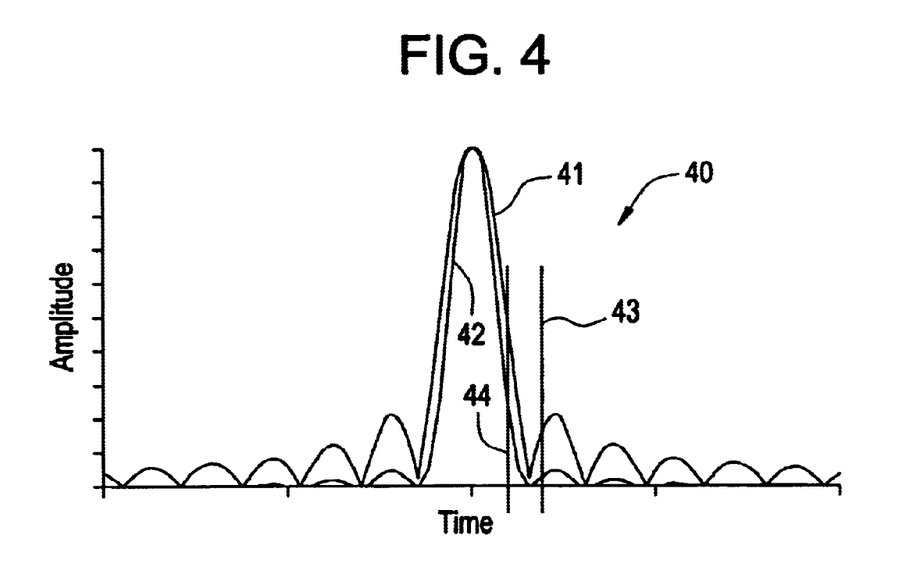
FIG. 4 is a graph illustrating the double zero construction of the autocorrelation function of the communication system in accordance with the invention.

Referring to FIG. 4, graph 40 plots time along the horizontal axis and amplitude along the vertical axis. Curves 41 and 42 illustrate the frequency spectrum of two separate channels. FIG. 4 illustrates double zeros in the autocorrelation function of the system. The fundamental mathematical idea illustrated by the autocorrelation function in FIG. 4 is that the zeros of the autocorrelation function are not simple zeros. The multiplicity of each zero of the autocorrelation function in FIG. 4 is 2. This invention allows one to create autocorrelation functions with arbitrary multiplicities of zeros.

In this construction of the system, the crosstalk of the near channels is significantly reduced. The area of crosstalk is illustrated as the area under curves 41 and 42 between lines 43 and 44 which shows that the crosstalk of the near channels is reduced significantly. These significant improvements in near channel crosstalk over the signals outlined in Coifman and Meyer now make it feasible to utilize all of the channels associated with this autocorrelation function.

As noted above, the Coifman and Meyer frequency windows, and the corresponding signals, only satisfy Property (1) described above. A simple square window in frequency will not satisfy either of the properties. Our invention creates signals which satisfy both properties. The signal illustrated by curve 42 in FIG. 4 is obtained in the following manner. The method described below can be programmed into software or any other machine readable device and operated on a processor or any similar device.

Let s(t) be a signal which is periodically orthogonal to its translates. Examples of such s(t) signals are sinc functions, appropriate signals whose autocorrelation function is a Coifman & Meyer window, or any variety of wavelets at any individual scale. Each of these signals will satisfy Property (1). Since the periodic translates of these signals are orthogonal, there will be periodic zeros in the autocorrelation function associated with s(t).

A Fourier transform operation is then performed on s(t). If we denote the Fourier transform of s(t) to be S(f), then the Fourier transform of the autocorrelation function of s(t) is $H(f)=|S(f)|^2$. After obtaining the Fourier transform of the autocorrelation function of s(t), H(f), we form a new autocorrelation function by convolving H(f) with itself to obtain G(f), where G(f)=Conv(H(f), H(f)) and where convolution is the standard convolution operation known in mathematics and signal processing. We then take the inverse Fourier transform of G(f) to obtain g(t) which is an autocorrelation function with periodic double zeros and the desired autocorrelation function.

The next step is recovering the signals which created g(t). The recovery of the signals is performed by taking the square root of G(f). That is, the new, recovered, signals will have the Fourier transforms S2(f)=sqrt(G(f)). These new signals generate an autocorrelation function which satisfies Property (1) and Property (2) thereby generating an autocorrelation function similar to the one illustrated by curve 42 in FIG. 4.

Finally, using the waveform which is created by sqrt(G(f))=S2(f) and by determining the inverse Fourier transform of the result, a filter is designed which will produce the desired signals, s2(t), which will generate the above autocorrelation function g(t).

Figure 5:
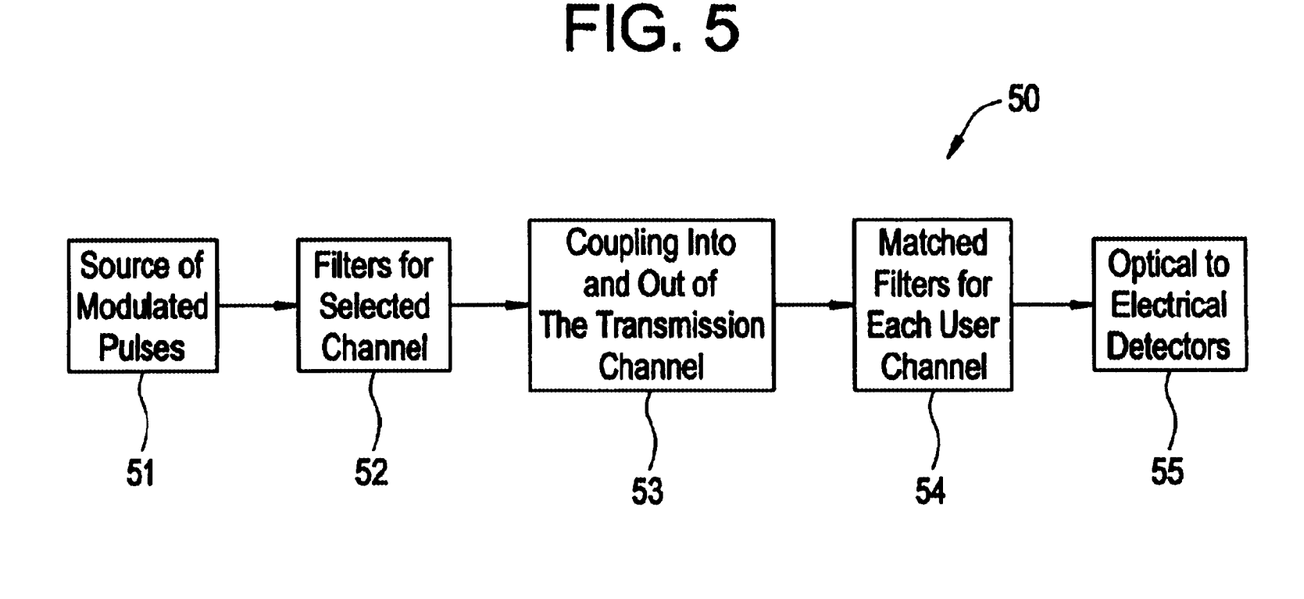
FIG. 5 is a block diagram illustrating how an embodiment of our invention is used as one of the components of one channel in a communications system.

One standard method for detecting the presence of a signal in a communications system, radar system, or image document is by matched filtering. The device consists primarily of four components and is shown in FIG. 5. FIG. 5 is a block diagram illustration of one channel 50 in a system we have introduced. When using matched filtering, the transmitted signal should be approximately known. In FIG. 5, this is done through components 51 and 52 which transmit a modulated pulse and then filter the signal in order to adjust its shape to the desired signal. The first component 51 is a source of modulated pulses providing a source for a data stream. The source could be any type of system that supplies a data stream such as a diode laser, or other laser transmitter, any wireless transmitter, any fiber transmitter, or any source system that produces signals which are relatively stable in time, or with known variants.

The second component is a filter 52 for the selected channel signal. Filter 52 is designed in accordance with the method described above. The filters can be selected from any material or can be a mechanical filter which will produce the signal required by the method described above. The filters may be thin film filters, in-fiber gratings, fiber optic Bragg gratings, spatial light modulation filters, or any other filter which will alter the amplitude and phase of individual frequencies of the modulated pulses in order to produce the desired signal form.

Then, the signal is transmitted through a medium such a fiber optic cable or other communications channel. Block 53 is a device to couple the individual channel onto the transmission channel for the system. It couples the signal into and out of the transmission channel. It can be any coupling and transmission device such as a fiber optic branch line, copper wire, or coaxial cable. Finally, at the receiver end, a corresponding matched filter searches for the particular signal which was originally transmitted. Block 54 is a matched filter that is specifically designed for the specially designed signals. It is the same filter as block 52 and may be constructed of the same materials as the filter in block 52. Filter 54 may also compensate for the dispersive and absorptive properties of the transmission line. The final detectors, shown in block 55, are standard power only optical to electrical detectors as there is no need to detect the phase of the signal in this final detection.

It will be understood by those skilled in the art that the order of some of the components could be changed without changing the operation of the system and without the need to modify the filters in block 52 or in block 54. For example, filter 52 could come before or after modulator 51, in some systems.

Figure 6:
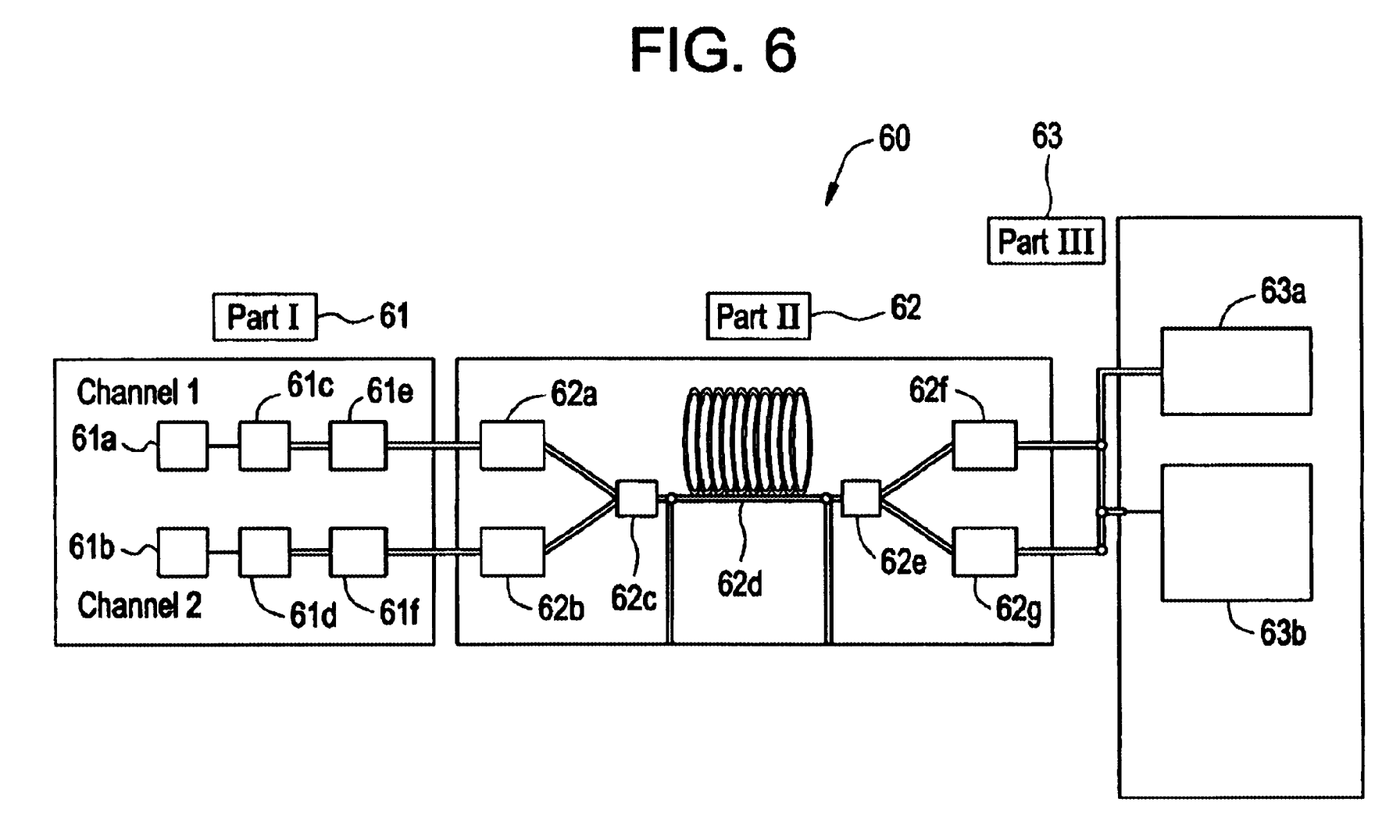
FIG. 6 is a block diagram illustrating in more detail how an embodiment of our invention is used in a two channel communications system.

FIG. 6 illustrates an embodiment of a communications system 60 incorporating the invention. System 60 illustrates only two channels for simplicity. Any number of channels may be used. Although system 60 is an optical system, the invention can be applied to other communications systems with the appropriate changes in components. In FIG. 6, Part I, 61, corresponds to block 51 in FIG. 5; Part II, 62, corresponds to blocks 52, 53, and 54 in FIG. 5. Part III, 63, corresponds to block 55 in FIG. 5. Each channel in part I, 61, has its own data source 61a and 61b. The data sources may the same type, or may be different. They need only provide the type of signal frequency previously described with respect to block 51 in FIG. 5, that is, a source of modulated pulses. The data streams from each of the data sources 61a and 61b are acted upon by laser transmitter 61c and 61d and then passed through time-frequency pules shapers 61e and 61f which are equivalent to the filters for each channel. As in FIG. 5, modulators 61a and 61b could be placed after filters 61e and 61f.

The data streams then enter Part II, 62, where they pass through filters 62a and 62b which are designed in accordance with the method described above. When the filtered data streams leave filters 62a and 62b, they pass through an optical coupler 62c to optical fiber 62d which transmits the data streams to a distant location, as far away as 100 km. When the data streams reach the distant location, they are passed through a power splitter 62e which divides the data streams into two channels and through matched filters 62f and 62g. As in Block 54 in FIG. 5, matched filters 62f and 62g are specifically designed for the specially designed signals. They are the same filters as block 62a and may be constructed of the same materials as the filters in blocks 62a and 62b.

After the data streams pass through matched filters 62f and 62g, they pass to optical to electrical detectors in Part III, 63, which comprises a dense wavelength-division multiplexed system 63a and a digital oscilloscope with electrical-to-optical converter 63b.

Figure 7:
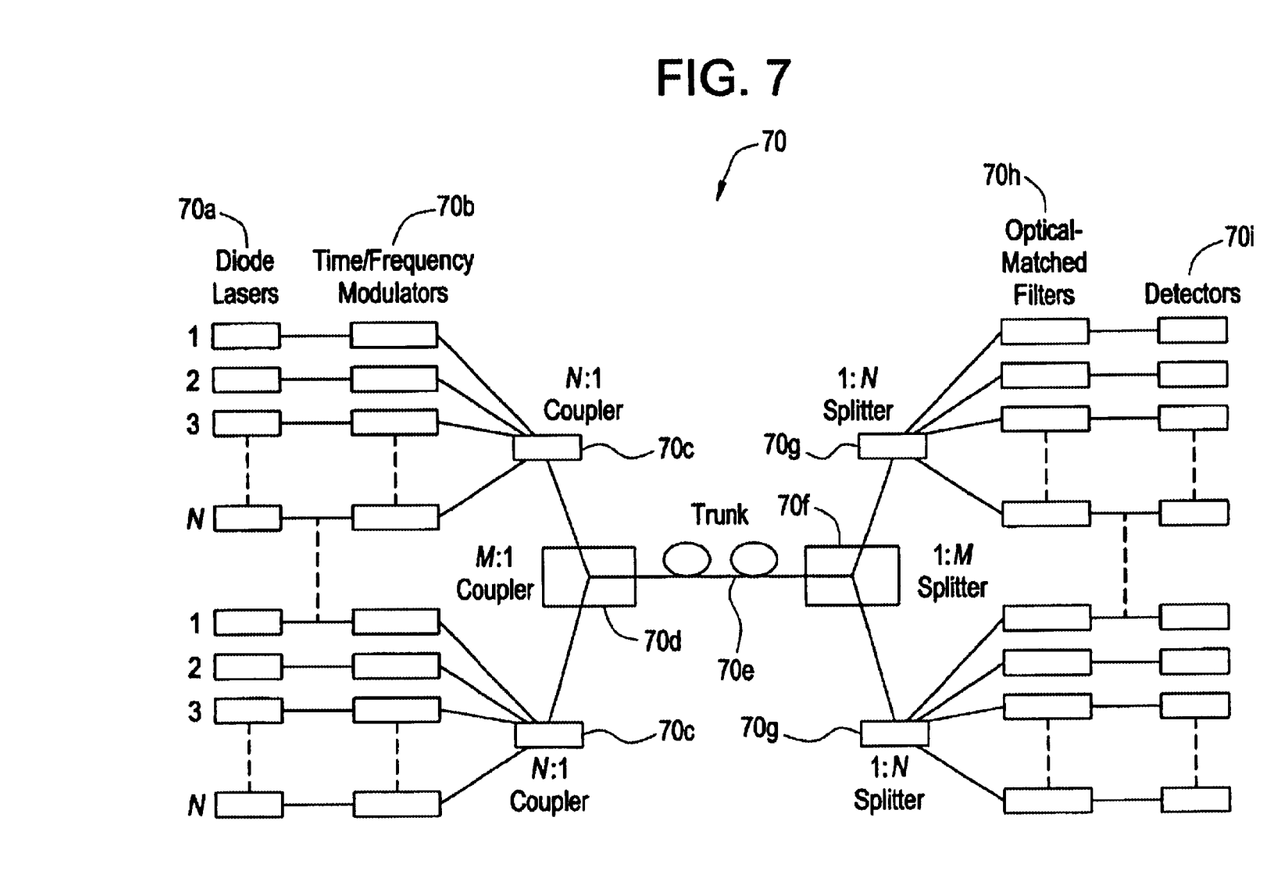
FIG. 7 is a block diagram illustrating how an embodiment of our invention is used in a global, complete communications system using an arbitrary number of channels.

FIG. 7 illustrates a global embodiment 70 of the components of a complete communications system utilizing our invention, consisting of N channels. The sources of the modulated pulses, illustrated by diode lasers 70a, could be any type of system such as wireless or fiber which produces signals which are relatively stable in time, or with known variants. The data streams from diode lasers 70a are shaped and modulated by time-frequency modulators 70b, via the filters manufactured in accordance with our method, into a digitally modulated series of electromagnetic pulses. These individual channels are then combined by couplers 70c and then coupled into one communication channel 70e by an optical coupler 70d. This channel could be a communication cable, such as a wire of fiber optic, or a particular spectrum in the air. At the destination, the single communication channel is acted upon by optical splitter 70f and transmitted to splitters 70g which divide the channel into the same number of channels as were initially generated by diode lasers 70a. From splitters 70g, optical-matched filters 70h separate each channel in accordance with our invention. If the channels were in the air, there will be no need for coupling and decoupling the individual channels. The filtered channels are then transmitted to optical to electrical detectors 70.

The method of our invention can be programmed into software or any other machine readable device and operated on a processor or any similar device.

After the filter specifications for the signal are determined by using the method of our invention, the filter specifications are fed into a device which manufactures the desired filter. A good manufacturing process would be to burn the filter, using a laser, into the core of an optical communication fiber while it is being drawn. Other suitable and conventional manufacturing processes would be, for example, a thin film deposition process performed by an epitaxial growth device.

Accordingly, a customer who wants to transmit information determines its needs and prepares its design specifications. Programmed software analyzes the design specifications using the method described herein. The software, applying the methods and algorithms described herein, will design the individual filters for the various channels of the system. After the designs for the filters are created, the designs will be transferred to optical filter design tools which consists of software and hardware. The filter manufacturing machines may be, for example, thin films, in-fiber gratings, optical fiber Bragg gratings, or any other suitable optical filters. After the filters are manufactures, they will be placed in the communications system as shown in FIGS. 5, 6, and 7.

While this invention has been described in conjunction with specific embodiments thereof, it is evident that many alternatives, modifications, and variations will be apparent to those skilled in the art. Accordingly, the preferred embodiments of the invention set forth herein are intended to be illustrative, not limiting. Various changes may be made without departing from the spirit and scope of the invention defined in the appended claims.

We claim:

1. A method of designing a filter for a multiple access communications system which minimizes crosstalk between channels comprising the step of identifying signals s2(t) having a first property of which an autocorrelation function associated with said s2(t) signals decay rapidly from a central lobe at a higher than 1/x rate which is typical of a wavelength division multiplexing communications system and having a second property in which the zero points of the autocorrelations function have high order multiplicities, the method,—further comprising the steps of:

(a) choosing a signal s(t) which is periodically orthogonal to its translates;

(b) determining a first autocorrelation function associated with s(t);

(c) denoting the Fourier transform of s(t) to be S(f);

(d) denoting the Fourier transform of said first autocorrelation function of s(t) as H(f);

(e) determining said Fourier transform, H(f), of said first autocorrelation function of s(t) in accordance with the equation $H(f)=|S(f)|^2$;

(f) forming the Fourier transform of a second autocorrelation function by convolving H(f) with itself;

(g) determining said convolution according to the equation G(f)=Conv(H(f), H(f)), wherein G(f) is a new autocorrelation function by convolving H(f) with itself;

(h) determining the square root of G(f);

(i) denoting said square root of G(f) as S2(f); and (j) taking the inverse Fourier transform of S2(f).

2. The method of claim 1 wherein s(t) is a sinc function.

3. The method of claim 1 wherein s(t) is a signal whose autocorrelation function is a Coifman Meyer window.

4. The method of claim 1 wherein s(t) is selected from any variety of wavelets at any individual scale.

5. The method of claim 1 wherein s(t) is any function whose translates are periodically orthogonal to s(t).

6. An electromagnetic matched filter based multiple access system for a communication system which minimizes crosstalk between channels designed in accordance with a method comprising the step of identifying signals having a property by which an autocorrelation function associated with said signals decay rapidly from a central lobe, at a higher than 1/x rate which is typical of a wavelength division multiplexing communication system, the electromagnetic matched filter based multiple access system comprising:

(a) a source of modulated pulses from a digital data stream;

(b) a first filter for shaping the modulated pulse into a desired pulse for transmission across the communication medium;

(c) a transmission medium which is accurately modeled;

(d) a second filter which is matched to the pulse which exits the communications medium; and (e) a detector which converts the modulated pulse stream into the original digital data stream;

wherein said first filter is designed in accordance with a method comprising the steps of:

(f) choosing a signal s(t) which is periodically orthogonal to its translates;

(g) determining a first autocorrelation function associated with s(t);

(h) denoting the Fourier transform of s(t) to be S(f);

(i) denoting the Fourier transform of said first autocorrelation function of s(t) as H(f);

(j) determining said Fourier transform, H(f), of said first autocorrelation function of s(t) in accordance with the equation $H(f)=|S(f)|^2$;

(k) forming the Fourier transform of a second autocorrelation function by convolving H(f) with itself;

(l) determining said convolution according to the equation G(f)=Conv(H(f), H(f)), wherein G(f) is a new autocorrelation function by convolving H(f) with itself;

(m) determining the square root of G(f);

(n) denoting said square root of G(f) as S2(f); and (o) taking the inverse Fourier transform of S2(f).

7. The electromagnetic matched filter based multiple access system of claim 6 wherein said first and second filters are identical.

8. The electromagnetic matched filter based multiple access system of claim 6 wherein said first filter is designed in accordance with a method comprising the step of identifying signals s2(t) having a first property by which the autocorrelation function associated with said s2(t) signals decay rapidly from the central lobe at a higher than 1/x rate which is typical of a wavelength division multiplexing communications system and having a second property in which the zero points of the autocorrelations function have high order multiplicities.

9. The electromagnetic matched filter based multiple access system of claim 8 wherein s(t) is any function whose translates are periodically orthogonal to s(t).

10. The electromagnetic matched filter based multiple access system of claim 6 wherein second filter is designed in accordance with a method comprising the step of identifying signals s2(t) having a first property by which the autocorrelation function associated with said s2(t) signals decay rapidly from the central lobe at a higher than 1/x rate which is typical of a wavelength division multiplexing communications system and having a second property in which the zero points of the autocorrelations function have high order multiplicities.

11. The electromagnetic matched filter based multiple access system of claim 10 wherein s(t) is any function whose translates are periodically orthogonal to s(t).

* * * * *